United States Patent
Vezza et al.

(10) Patent No.: US 8,073,554 B2
(45) Date of Patent: Dec. 6, 2011

(54) SYSTEM AND METHOD FOR PROVIDING POWER MANAGEMENT IN A SENSOR NETWORK

(75) Inventors: Brian Vezza, Allen, TX (US); Kent Felske, Kanata (CA); Alan Graves, Kanata (CA); John Watkins, Ottawa (CA); Guy Duxbury, Nepean (CA); Tom Chmara, Richmond (CA); Jeff Fitchett, Kanata (CA)

(73) Assignee: Nortel Networks Limited, Mississauga, Ontario (CA)

( * ) Notice: Subject to any disclaimer, the term of this patent is extended or adjusted under 35 U.S.C. 154(b) by 631 days.

(21) Appl. No.: 11/613,313

(22) Filed: Dec. 20, 2006

(65) Prior Publication Data

US 2008/0150360 A1  Jun. 26, 2008

(51) Int. Cl.
G05B 11/01 (2006.01)
(52) U.S. Cl. ......................................................... 700/22
(58) Field of Classification Search .................... 700/22, 700/27; 340/7.32
See application file for complete search history.

(56) References Cited

U.S. PATENT DOCUMENTS

| | | |
|---|---|---|
| 5,959,529 A | 9/1999 | Kail, IV |
| 6,208,247 B1 | 3/2001 | Agre et al. |
| 6,859,831 B1 | 2/2005 | Gelvin et al. |
| 2004/0215693 A1 | 10/2004 | Thompson |

OTHER PUBLICATIONS

Klues et al. ; "Demo Abstract: A Unified Architecture for Flexible Radio Power Management in Wireless Sensor Networks"; Nov. 21, 2006; pp. 348-349.*
Raghunathan et al.; "Energy-Aware Wireless Microsensor Networks"; Mar. 2002; IEEE Singal Processing Magazine; pp. 40-50.*
Sinha et al; "Dynamic Power Management in Wireless Sensor Networks"; 2001; IEEE Design & Test of Computers; pp. 62-74.*
Raghunathan et al.; "Energy Efficient Design of Wireless Sensor Nodes"; 2004 Wireless Sensor Networks; pp. 52-69.*

* cited by examiner

Primary Examiner — Albert Decady
Assistant Examiner — Chad Rapp
(74) Attorney, Agent, or Firm — Anderson Gorecki & Manaras LLP

(57) ABSTRACT

The present invention relates to a system and method for providing power management to sensing nodes in a sensor network. A system may include a plurality of sensing nodes, each sensing node connected through a power management device to an external power source, such as a powered node of another network, for managing power from the external power source to the sensing node. Beneficially, a plurality of power management devices allow for a sensor network of fixed or mobile wireless sensing nodes or sensor gateways to make use of power from an external source such as an another network e.g. an existing emergency lighting system or other similar powered building system. Thus for example, a sensor or group of sensing nodes and their associated power management devices may be integral with or co-located in proximity to powered nodes of these other networks. An intelligent power management device connected to at least one of the sensing nodes may provide for power policy management to sensing nodes based on monitoring power conditions such as available power, power level status, and information obtained from the sensing nodes indicative of network conditions, detecting a change therein, and regulating power to the sensing node depending on the change.

26 Claims, 5 Drawing Sheets

SYSTEM AND METHOD FOR PROVIDING POWER MANAGEMENT IN A SENSOR NETWORK

FIELD OF INVENTION

The present invention relates to sensor networks, and in particular, to a system and method for providing power management to sensing nodes in a sensor network.

BACKGROUND

Power management is a critical issue for sensing nodes in a sensor network. Since many sensing nodes are powered by batteries, it is apparent that for every function they perform their energy supply decreases. With potentially hundreds to tens of thousands of sensing nodes in a sensor network changing batteries of sensing nodes or refreshing rechargeable batteries can pose a difficult challenge. As such, sensing nodes typically use one or more techniques to mitigate this problem.

One such technique is to connect sensing nodes to regular electrical outlets using power plugs However, it is often impractical for sensor networks with a large number of sensors to be plugged into regular electrical outlets. Not only does it restrict sensor placement, it limits use of existing outlets by other equipment. Furthermore, dedicated wiring adds significant cost and may simply be impractical or undesirably expensive for retrofitting extensive sensor networks in existing buildings.

Another technique is the use of low power sensors and sophisticated power management processes to limit use of battery power, in which sensing nodes are configured to utilize very little power during their off duty cycles. Similar power management techniques try to keep the power draw as low as possible, such that the sensing nodes are sensing for only a small fraction of the time. However for sensing nodes that must run for the majority of the time or for high performance sensing nodes, this technique does not help because the battery power of a sensing node may only last for a matter of hours before it runs out. Furthermore, sensing nodes are used at less than full capabilities solely because of power limitations Another technique is energy scavenging, which may include e.g. RF induction or the use of solar power. Although the addition of solar energy puts less strain on batteries of sensing nodes, there must be sufficient light to enable the device to be powered device at all times when required. This limitation puts restrictions on the placement of the sensing node, which could potentially affect sensor network performance.

Accordingly, there is a need for a system and method that can allow for more effective power management of sensing nodes in a sensor network.

SUMMARY OF THE INVENTION

It is an object of the present invention to obviate or mitigate at least one of the aforementioned problems.

According to one aspect of the present invention there is provided a power management system for a sensor network comprising: a plurality of sensing nodes forming at least part of a sensor network, each sensing node capable of communicating with other sensing nodes, and each of the plurality of sensing nodes having one or more associated power management devices, and each power management device associated with a powered node of one of a plurality of other networks other than the sensor network, and each sensing node being interconnected through the one or more associated power management devices for receiving power via the one or more power management devices from the powered nodes of the other network.

The power management device may be integral with a sensing node associated with the power management device or located in close proximity to the sensing nodes associated with the power management device. In other arrangements, at least one sensing node is integral with a power management device and other sensing nodes are in close proximity Advantageously, a power management device is an intelligent device and connected to at least one of the sensing nodes using wired or wireless links.

At least one of the sensing nodes which is connected via the one or more associated power management device to the associated powered node may be a mobile wireless sensing node, stationary wireless sensing node or wireless sensor gateway. At least one of the sensing nodes may alternatively be a sensor gateway node or a cluster head node.

For example, the powered node may be provided by an existing emergency system, wired network or wireless network other than the sensor network.

Beneficially, the power management device may be responsive to power conditions and/or to network conditions detected by the sensor network to regulate power to sensing nodes of the sensing network depending on said conditions.

Where the other network comprises an emergency management system, at least one power management device may be responsive to information relating to power policies received from the emergency management system to regulate power to associated sensing nodes.

The other network may provide a channel other than the sensor network for communication between sensing nodes, or for communication between a sensing node and an external communication network.

Another aspect of the invention provides a power management device for managing power to one or more associated sensing nodes of a sensor network from a powered node of a network other than the sensor network, the power management device, the device comprising: a detector for monitoring one or more of power conditions, and network conditions detected by the sensor network; and a power converter to convert power from a powered node of the other network to power appropriate for use by the power management device and to the one or more associated sensing nodes dependent on said conditions Yet another aspect of the invention provides for a method for managing the power to a sensor network from a powered node of a network other than the sensor network, to one or more associated sensing nodes in a sensor network, the method comprising the steps of: monitoring power conditions and/or network conditions detected by the sensor network; and regulating power to the sensing node or to nodes of the other network depending on the conditions. For example, monitoring power conditions and network conditions detected by the sensor network; may include: monitoring a power level from an external source to a sensing node; detecting a change in power level status with a sensing node; and regulating power to the sensing node depending on power level status. For instance, the step of regulating power to the sensing node may comprises reducing a power duty cycle for the sensing node for a predetermined period responsive to a change in power level status from regular power level status; and restoring a higher or full duty cycle for the sensing node when regular power level status is restored. Power level status may be a function of time and condition.

Other aspects and features of the present invention will become apparent to those ordinarily skilled in the art upon review in conjunction with the accompanying figures.

DESCRIPTION OF DRAWINGS

Embodiments of the present invention will now be described, by way of example, with reference to the attached Figures, wherein.

DETAILED DESCRIPTION

Figure 1:
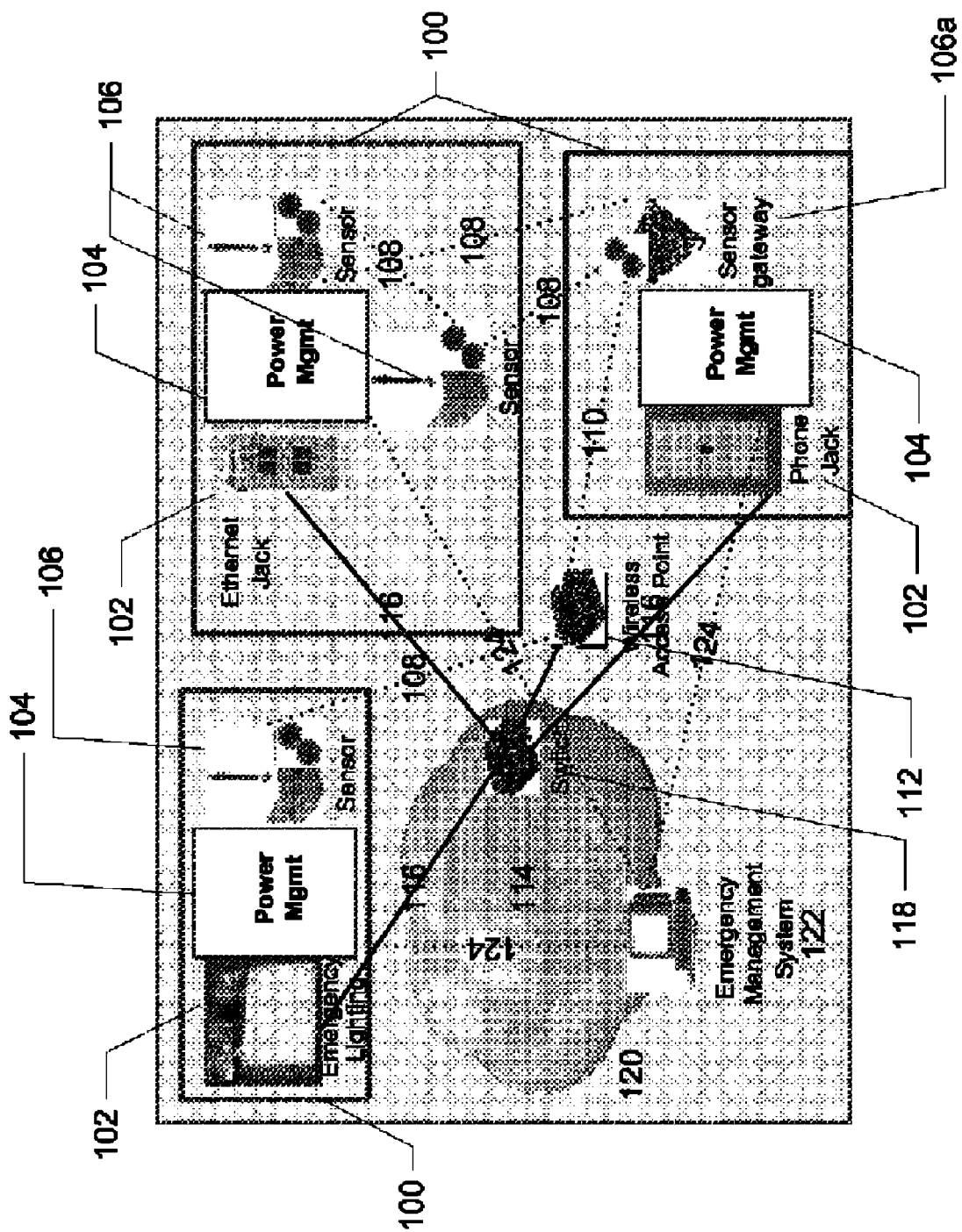
FIG. 1 illustrates a system for managing power of sensing nodes in a sensor network according to an embodiment of the invention.

Referring to FIG. 1, which shows schematically a system for managing power of a sensor network according to an embodiment of the present invention, a sensor network 100 comprises a plurality of sensing nodes 106. For simplicity, only a few nodes are shown schematically in FIG. 1

The sensor network 100 may comprise a wide range of sensing nodes 106 such as stationary or mobile sensing nodes, where each node could be wired or wireless. Each sensing node may perform one or more distinct sensing activities such as sensing a particular physical, radiation, chemical or lighting presence, and may include RFID sensors. The sensing nodes 106 in the sensor network 100 are able to communicate with other sensing nodes in the sensor network 100 via wired and or wireless links 108 according to well known sensor network routing protocols, such as flooding, SPIN and LEACH.

As in a conventional sensor network, the sensor network 100 is structured according to known sensor network architectures such as standalone sensors, point-to-point configurations, star configuration, mesh configuration hierarchical networks and cluster networks and may include mobile sensors, intermittent sensors, either wirelessly connected, or having wired connections, e.g. through Ethernet.

Sensing nodes 106 in the sensor network 100 can also communicate with an external IP or data network 114 via a special sensing node called a sensor gateway node 106a. In this specific example, the sensor gateway node 106a establishes a connection 110 on behalf of a sensing node 106 to the external network 114 via a wireless access point 112 and switch 118. In the sensor network 100, each sensing node 106, including sensor gateway node 106a, may communicate with an appropriate external network or system, ie. a network other than the sensor network. For example, video-sensing nodes, which capture video surveillance information, could be connected to a security office network. Temperature sensors, which capture temperature information, could be connected to a building operations network and in particular, directly to a Heating, Ventilation and Air Conditioning (HVAC) system for HVAC adjustment purposes.

In the present embodiment, sensing nodes 106, including sensor gateway nodes 106a, are each associated with a power management device 104 and located in proximity to components of other networks providing external power sources 102. The external power source 102 may be powered components of available emergency systems, communications networks, or other building systems. For example, external power sources 102 may be powered nodes of another wired network such as an electrical outlet, Ethernet port, phone jack, or some other telecommunications port or connection point. Alternatively the external power source may be a powered node 104 of emergency lighting system or similar emergency system. It will be appreciated that sensing nodes 106, 106a of the sensor network may therefore receive power from one of a number of possible external power sources 102 associated with other networks or systems. In practical applications, sensing nodes 106 may be directly integrated with the corresponding power management device 104, and co-located with a powered node of the other network to provide for connection to the external power source 102. Thus external power is provided to a sensing node 106 or a group of sensing nodes through the associated power management device 104, which regulates power from the external source to one or more sensing nodes 106.

Power management devices 104 may include a storage battery, a charger for that storage battery coupled to one or more external power sources for charging the storage battery and a power converter, which converts battery power to power appropriate for use by power management device and the sensing nodes.

As mentioned above, the sensor network 100 provides for communication between sensors using known sensor routing protocols. When an external power source 102 is part of a communications network 120, the power management device 104 associated with the external power source 102 may also provide, via switch 118, for communication of a sensing node with other sensing nodes in the network 100 or with nodes of another network through the communications network via the network communications link 116. For example, sensing node 106 connected to an emergency system power source, such as a powered node of an emergency lighting system 102, may communicate over the existing emergency equipment wiring connections 116 either using messaging protocols already defined for the emergency equipment or as an additional non-interfering superimposed modulation, such as x10 or XDSL. Thus the sensing nodes 106, 106a of the sensor network may therefore communicate via the sensor network as well as through other external communications networks, as well as receiving power from one or more external networks power sources and/or battery backup as needed.

The power management devices 104 provides regulation of power to each associated sensing node from the respective external source 102, and provides for intelligent power management of sensing nodes. In particular, power management devices are power and sensor aware, and may be responsive to a change in available power, or a change in condition of the associated sensing node, to regulate power to the sensing node. In one example, as illustrated schematically in FIG. 2, the power management device 104 functions to select and apply an appropriate power management policy, through detection of a change in power, status or condition in the associated sensing node and responsive to the change in power or condition, regulates power output from the external power source to provide the required input to the sensing node.

The power management device 104 performs the function of an intelligent control system that follows a specific powering policy to change either the power delivered to the sensing nodes 106, 106a or the power demand of the sensing nodes 106, 106a, by controlling one or more of the duty cycle, on-time, data resolution, sensitivity, output bandwidth and/or other parameters of the sensing node. These parameters may be controlled independently, or interdependently.

By using an intelligent power management device 104, policies and decisions can be made on how to distribute power to each sensing node. The power management device 104, may receive and use power from the associated power source 102, and battery backup if used, and receives power level status information from associated sensing nodes 106, indicative of system conditions such as available power and a power level status (e.g. normal or emergency status) to make a decision. For example, the power management device 104 may monitor the power from an external source to a sensing node and detect a power level status for the sensing node. The power level status is a function of both condition and time where examples include, among others, normal/business hours, normal/off hours, emergency/business hours, emergency/off hours. Depending upon the power level status, the power management device may regulate power to the sensing node as appropriate. As a specific example, if the power level status is emergency/business hours or emergency/off hours, the step of regulating power to the sensing node would include reducing the duty cycle for the sensing node for a predetermined period, depending on whether the time is business hours or off hours, and restoring full duty cycle for the sensing node when regular power level status is restored.

Figure 2:
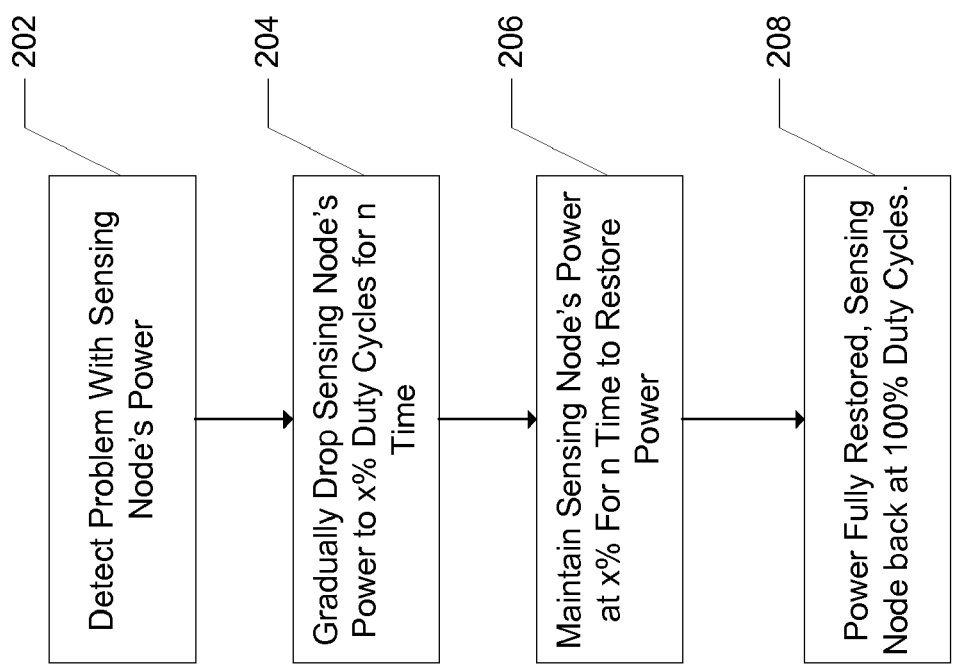
FIG. 2 illustrates a method for managing power of a sensing node in a sensor network using a power management device according to an embodiment of the invention.

As a simple example, referring to FIG. 2, if the power management device receives input 202 indicating a power emergency, i.e. a change in power level status at one of the sensing nodes during business hours, the power management device would trigger a gradual drop in the power 204 to the sensing node to a x % duty cycle in a predetermined time, for example to 50% over a five-minute period. After that time, the power management device's regulator may be able to maintain the power of the sensing node at an intermediate level, i.e. y % duty cycle, where y %>x %, for another predetermined period, or until the normal power level status is restored 206. Once normal power level status is fully restored 208, the power management device may allow the sensing node to go back to a higher or 100% duty cycle 208. It will be apparent that many other variations are possible.

In addition to being power and sensor aware through monitoring for changes in information indicative of power conditions, which may include available power and power quality (voltage, current, regulation) and sensor conditions such as a power level status, and available power for an associated sensing node, the power management device 104 may also be environment aware through monitoring information on environmental conditions, such as data from a wider range of sensing nodes of the sensor network, representative of dynamic conditions of the network environment. Dynamic conditions may include information such as power environment and operational condition of the sensor network, such as the number or type of sensing nodes that are powered or powered down, their status and location, as well as other data provided by the sensing nodes of the sensor network.

By configuring sensing node powering policy and decisions to be influenced by data indicative of environmental conditions, power management policies can be applied to sensing nodes of the sensor network on a dynamic and fine-grained basis. For example, when a group of two or more sensing nodes share the same power management device, power management policies can be applied to a group of sensing nodes in a localized manner. On a more extended basis, when the power management device also monitors information from other sensing nodes of the sensor network itself, a broader or overall view of the sensor network environment may be obtained and power management policy coordinated accordingly. Additionally, in a centralized or distributed approach, an Emergency Management Power System 122 may also monitor information from sensing nodes of the sensor network via network communication links 116 and use the information to create or select appropriate power management policies. Information would then be sent from the Emergency Power Management System to the power management devices 104 using links 124 or network communication links 116, to enable appropriate policies to be applied to the sensing nodes under control of the associated power management device. Thus a power management device may be aware of the power conditions, sensor status, and network conditions, of an individual sensing node, groups of sensing nodes, or the entire sensor network environment to manage power and apply power management policies accordingly, i.e. in node centric or network centric modes, or localized modes involving a group of sensing nodes or a subset of sensing nodes.

When power to a plurality of sensing nodes is managed by a common power management device, device centric mode of power management allows for appropriate environment aware distribution of available power amongst the associated sensing nodes. Beneficially, in critical or emergency situations, an environment-aware approach to power management using dynamic data from other sensing nodes or from the entire sensor network allows for more effective distribution of limited power resources to the sensor network and associated systems, taking into account the overall environmental conditions as well as current or changing power status and sensor status. Power management may be dynamic, for example, under changing conditions, or under changing power management policies.

Figure 3:
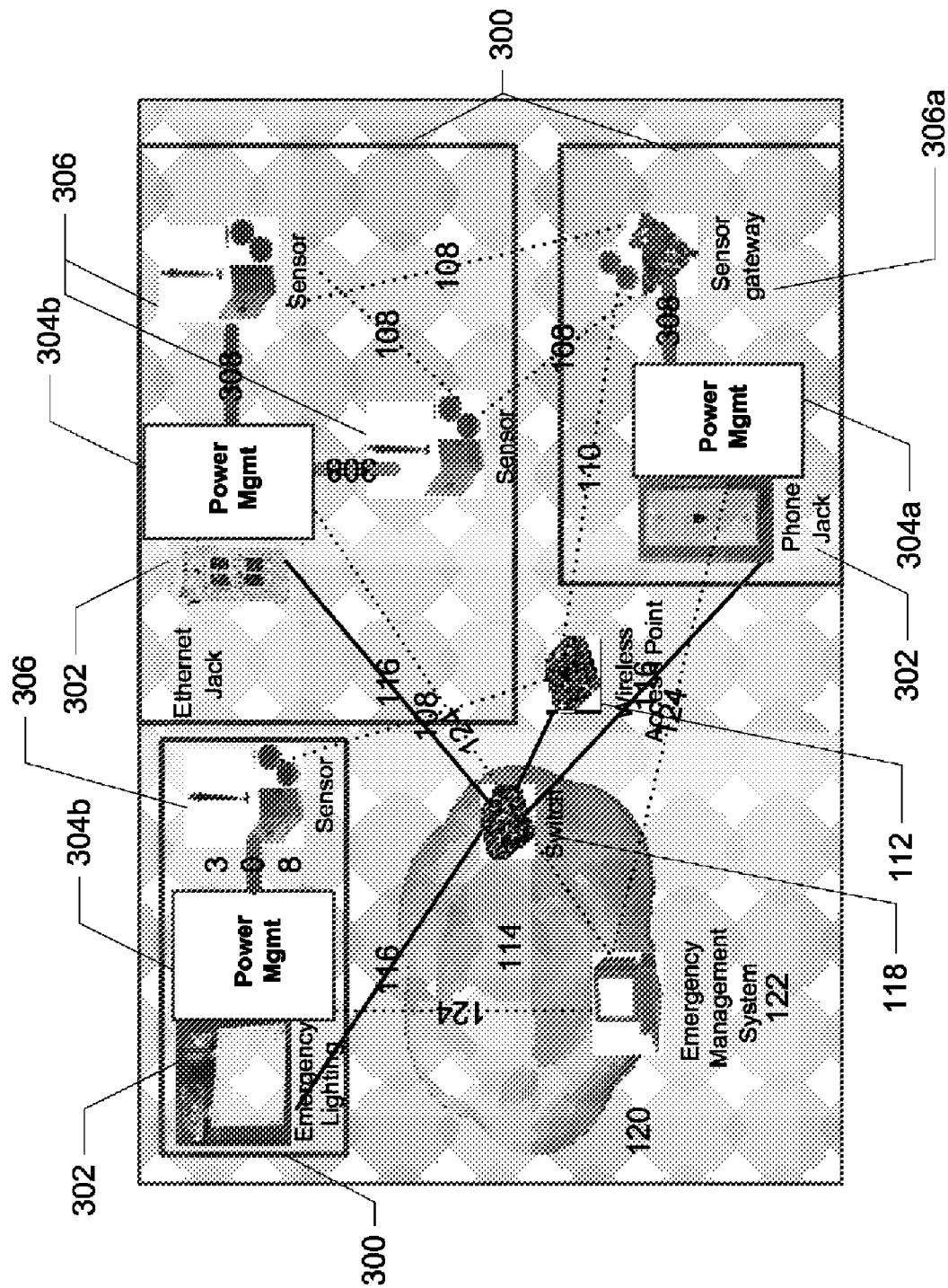
FIG. 3 illustrates a second system for managing power of sensing nodes in a sensor network according to another embodiment.

Thus, in an alternative embodiment of the present invention, as illustrated schematically in FIG. 3, a sensor network 300 comprises sensing nodes 306 located in proximity to one or more power management devices 304a, 304b which may be integrated with components of other networks providing external power sources 302. For example, an open power port on the sensing node 306 is connected either directly as in first embodiment or (as shown in FIG. 3) via a power connection 308 such as a cable or tap to one or more power management devices 304 integrated with a nearby external power source 302. Thus where a dedicated power outlet or wired power network for the sensing nodes is not available, the individual sensing nodes of the sensor network may receive power from one of a plurality of available external power sources through associated power management device 304a or 304b. In the present embodiment, the power management device 304a, 304b can operate in any of the modes described above with respect to the first embodiment, including environment-aware dynamic monitoring. In addition, when each sensing node is associated with one or more power management devices, power management for the sensing network may be distributed amongst respective power sources, which may be from more than one other external network, such as an emergency lighting circuit and a telecommunications network. When individual sensing nodes are associated with more than one power source, power management policies can be applied in a distributed manner from several power sources for effective distribution of available power, which may be particularly beneficial in emergency situations where one power source fails, or for maintaining power to key sensing nodes such as gateway nodes.

Figure 4:
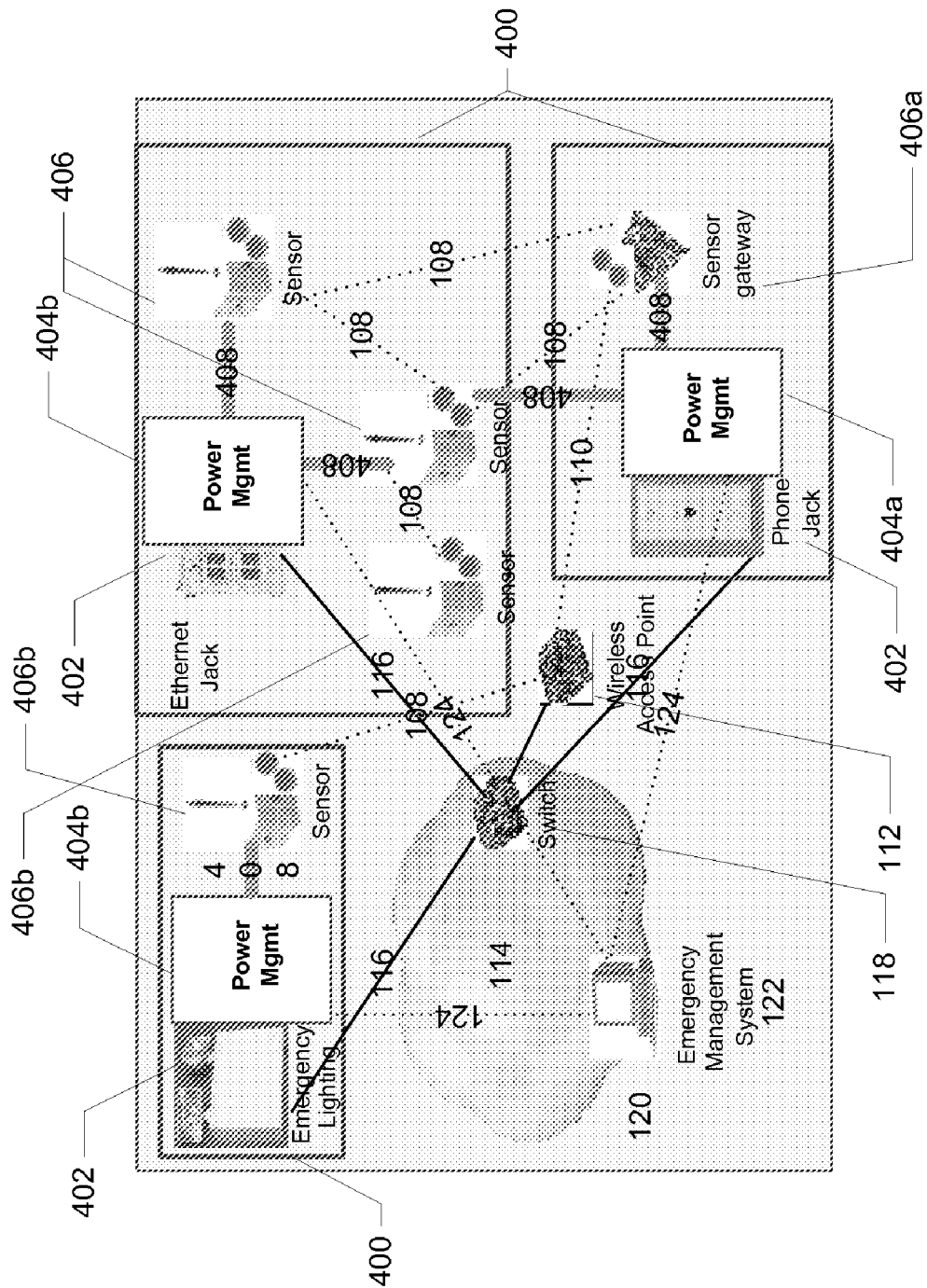
FIG. 4 illustrates a third system for managing power of sensing nodes in a sensor network according to yet another embodiment.

In another alternative embodiment of the present invention, as illustrated schematically in FIG. 4, sensor networks 400 comprises sensing nodes 406, power management devices 404 and associated power sources 402. The sensor network 400 communicates through link 110 through network gateway 112 to IP network 114 as in other embodiments. In this particular embodiment, some sensing nodes are connected via individual power management devices 404a to external power sources, and other groups of sensing nodes are powered by a common power management device 404b, and other sensing nodes may be maintained through battery power only 406b. Key sensing nodes 406 that perform a significant amount of processing work, such as sensor gateway node 406a are located in close proximity or integrated with associated power management devices 404a, 404b and external power source points 402 to ensure power is maintained to these key sensing nodes. In this embodiment, the power management devices 404a, 404b preferably operate in an environment-aware power management mode, which may be beneficial in managing power to the overall network, and may also operate in a sensor centric mode e.g. to ensure power is maintained as a priority to key sensing nodes. The external power source points 402, which in this example are powered nodes of emergency lighting system, are utilized to extend useful lifetime of key sensing nodes, which may otherwise suffer from limited battery lifetimes. In this embodiment, all non-key sensing nodes 406 in a sensor network 400 such as a cluster-based network would ideally be within a hop or two from a sensing node connected to an external power source 402. Thus, the present embodiment provides a sensor network 400 with reduced restriction on sensor network architecture or node placement. Thus, existing applications of sensor networks can be readily extended by improved power management provided according to the present embodiment. While a number of arrangements are shown in the figures for this and other embodiments, these are not intended to be exhaustive and alternative arrangements are contemplated in which sensing nodes may have one connection or multiple connections to external power sources through one or power management devices, depending on particular requirements of the sensor network.

In embodiments described above, beneficially as a second level of redundancy, each sensing node within a sensor network, regardless as to whether they are connected to an external power source or not, would optionally include rechargeable batteries. As a best practice, one would ensure that the batteries are kept charged and not used unless both normal power and emergency power are unavailable such as when a generator runs out of fuel. The specific batteries would depend on the sensing device. Some may be very small like a watch battery while others could be larger such as A, B, C, D batteries or fuel cells depending on the power needs of the specific sensing node. Thus sensing nodes having associated or integral power management devices provide for more effective utilization of available regular power sources, emergency back-up power sources, or battery power for larger numbers of sensors or multiple sensors associated existing emergency systems.

Figure 5:
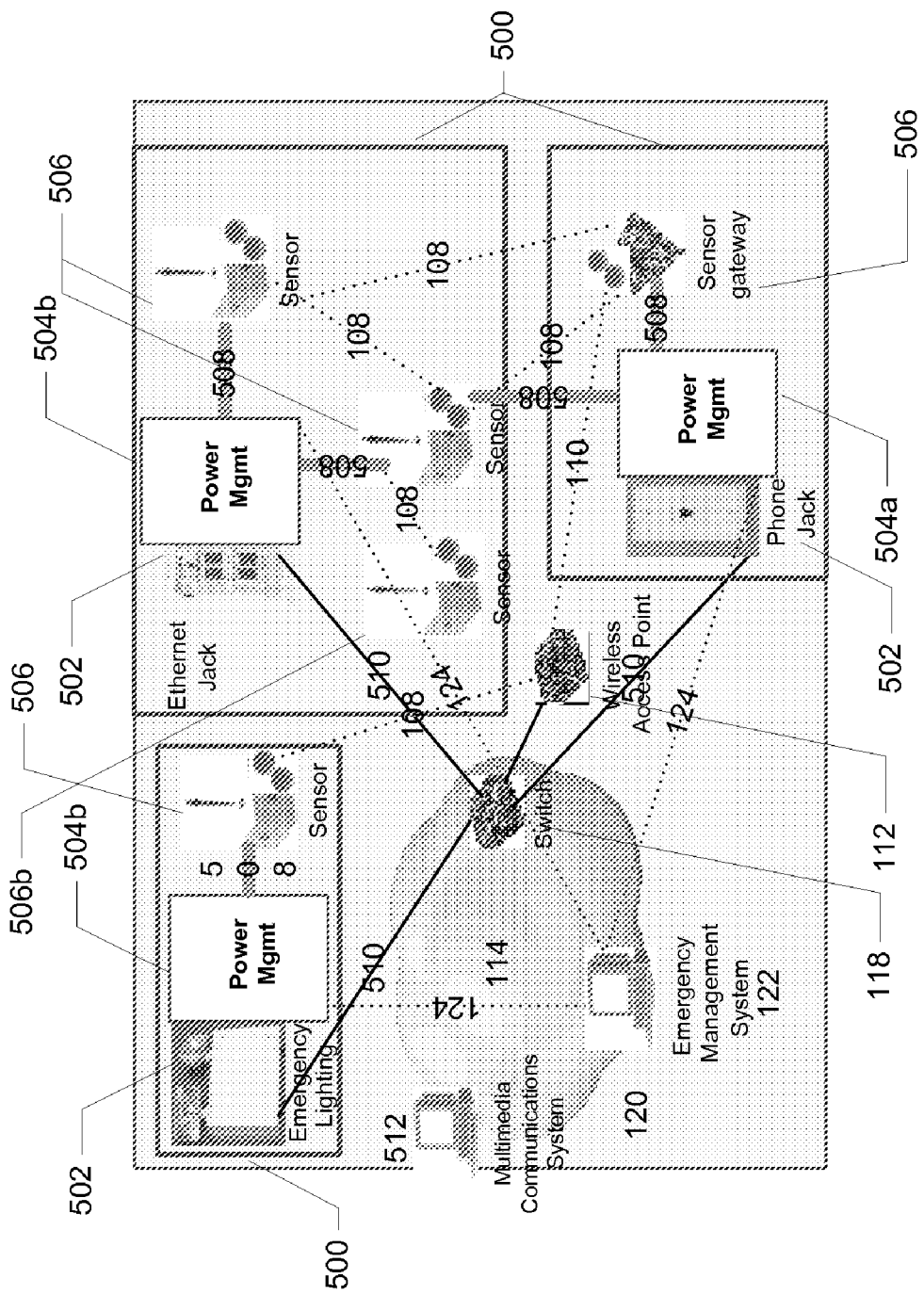
FIG. 5 shows a representation of a system for managing power of sensing nodes in a sensing network according to a further embodiment of the invention.

A sensor network according to embodiments of the present invention may be found in a smart building, for example as illustrated schematically in FIG. 5, as part of the building's evacuation control system. In many respects this embodiment is similar to those previously described. The sensing nodes 506 in such a network 500 would be integrated or in close proximity to an existing power source 502 in the building's wired network such as an electrical outlet, phone jack or emergency lighting point. By combining a sensing node 506, a corresponding power management device 504 and an external power source 502, the sensing node can continuously perform process-intensive, potentially life saving tasks without requiring continual battery replacement or refresh. Thus, when a power management device 504 using sensor-aware monitoring, detects a power status change at a sensing node, the power management device can regulate power from the power source to the sensing node according to an algorithm such as the one described with reference to FIG. 2. Furthermore, sensing nodes 506 can communicate with other sensing nodes 506 in the network 500 according to well known sensor network protocols or can communicate with nodes residing in an external network via a sensor gateway node or the via the external power source 502. For example, if sensing nodes 506 in a sensor network 500 detect a potentially life threatening situation, the sensing nodes 506 can use links 510 to communicate with the building's multimedia communications system 512 such that the communications system 512 is used to alert people in the building of the present situation. An Emergency Management Power system 122 may manage power policy as described with reference to the first embodiment above. In large buildings, there may be more than one Emergency Management Power system 122, each managing a domain such as an individual floor or department. A distributed system provides for communication between a plurality of Emergency Management Power systems to coordinate overall power management policy, while individually each is responsible for setting power management policy to their own domain.

A power management device using environment-aware monitoring may allocate power to sensing nodes of the sensor network at the expense of power available to other powered systems, e.g to emergency lighting. For example, a sensor network in a corridor on a floor of the building may comprise of motion and chemical sensing nodes powered through the power management device from an external power source which is part of the building's lighting network. In this example, if the motion sensing nodes indicate that the floor has been evacuated and the chemical sensing nodes detect hazardous gases, the power management device uses this information to manage available power, e.g. by dropping the lighting power by 60% and keep both the motion and chemical sensors' power at 100% until the situation is resolved, or for example, if power level status changes, the environmental conditions as indicated by data received from the sensor network changes, or other power policies are implemented.

In the case where sensing nodes comprise multiple sensor types that work together, intelligent power management capabilities may apply different policies to each sensor type or even to each individual sensor based on the particular situation. Referring to the previous example, until people have evacuated, one potential power policy would be to keep the lights and motion sensing nodes at full power and chemical sensing nodes at increased duty cycles but not at full power. After the area has been evacuated, another potential policy could be to reduce power to the lights as well as the motion sensing nodes but increase power to the chemical sensing nodes to 100%. It will be appreciated that many other possible scenarios and power management policies may be applicable to specific conditions. With many different possible options, system vendors may develop preset power policies for multiple scenarios, or users may have the ability to define and implement their own policies for individual dynamic circumstances.

Thus, where emergency systems have a centralized emergency management system and the network such as the emergency network provides an alternative communication for the sensor network, in addition to receiving information from other sensing nodes of the sensor network, advantageously data may be monitored or received by a power management device from the other networks and also used determine power management policy. Furthermore, information regarding intelligent power management of the sensor network may be fed back to the emergency management system or other communications systems such as the multimedia communication system to provide information on status of network or environment, to facilitate other aspects of emergency communications and management.

In practical applications, for buildings with existing emergency lighting systems, as the use of LEDs or other alternative lower power light sources for emergency lighting systems lighting grows, which use a fraction of power requirements of conventional lighting, power is freed up which may be directed to other devices, i.e. retrofitting of e.g. sensors and gateways, RFID, devices of a sensor network as described above, to add functionality for emergency management systems. In addition, with use of intelligent power management system, available emergency powered systems may be used in non-emergency situations to power sensor networks and add functionality to a smart building network such as sensor networking capabilities described above, not only for conventional emergency management, but for other applications such as critical asset tracking and security. Intelligent emergency power management enables available power to be redirected from lower priority applications to maintain required powering specifications for emergency situations.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A power management system for a sensor network comprising:
   a plurality of sensing nodes forming at least part of a sensor network, each sensing node communicating with other sensing nodes and all of the plurality of sensing nodes having one associated power management device associated with a powered node of a network other than the sensor network, and each sensing node being interconnected through the power management device for receiving power from the powered node of the other network,
   wherein the power management device applies a first power management policy to a first sensing node and applies a second power management policy to a second sensing node, the first and second power management policies each specifying at least one of: power delivered to the sensing node and power demand of the sensing node.

2. The power management system for a sensor network according to claim 1 wherein the power management device is integral with at least one of the sensing nodes associated with the power management device.

3. The power management system for a sensor network according to claim 2 wherein the at least one of the sensing nodes is connected via one or more associated power management devices to the associated powered node and is a mobile wireless sensing node, stationary wireless sensing node or wireless sensor gateway.

4. The power management system for a sensor network according to claim 2 wherein the at least one of the sensing nodes is connected via one or more associated power management devices to the associated powered node and is a sensor gateway node or a cluster head node.

5. The power management system for a sensor network according to claim 2 wherein the powered node is provided by an existing emergency system, wired network or wireless network other than the sensor network.

6. The power management system for a sensor network according to claim 1 wherein the power management device is located in close proximity to the sensing nodes associated with the power management device.

7. The power management system for a sensor network according to claim 6 wherein at least one of the sensing nodes is connected via one or more associated power management devices to the associated powered node and is a mobile wireless sensing node, stationary wireless sensing node or wireless sensor gateway.

8. The power management system for a sensor network according to claim 6 wherein at least one of the sensing nodes is connected via one or more associated power management devices to the associated powered node and is a sensor gateway node or a cluster head node.

9. The power management system for a sensor network according to claim 6 wherein the powered node is provided by an existing emergency system, wired network or wireless network other than the sensor network.

10. The power management system for a sensor network according to claim 1 wherein the power management device is integral with at least one of the sensing nodes, and in close proximity to other sensing nodes associated with the power management device.

11. The power management system for a sensor network according to claim 1 wherein the power management device is responsive to power conditions to regulate power to associated sensing nodes of the sensing network.

12. The power management system for a sensor network according to claim 1 wherein the power management device is responsive to network conditions detected by the sensor network, to regulate power to associated sensing nodes of the sensing network.

13. The power management system for a sensor network according to claim 1 wherein the power management device is responsive to power conditions, and to network conditions detected by the sensor network, to regulate power to the sensing node depending on said conditions.

14. The power management system for a sensor network according to claim 1 wherein the other network comprises an emergency management system and at least one power management device is responsive to information relating to power policies received from the emergency management system to regulate power to associated sensing nodes.

15. The power management system for a sensor network according to claim 1 wherein the power management device is responsive to one or more of power conditions and network conditions to regulate power to nodes of the other network.

16. The power management system for a sensor network according to claim 1 wherein the other network provides a channel other than the sensor network for communication between sensing nodes.

17. The power management system for a sensor network according to claim 1 wherein the other network provides a channel other than the sensor network for communication between at least one of the sensing nodes and an external communication network.

18. The power management system for a sensor network according to claim 1 wherein a sensor gateway node provides a channel for communication between at least one of the sensing nodes and an external communication network.

19. The sensor network according to claim 1 wherein the power management device is an intelligent device and connected to at least one of the sensing nodes using wired or wireless links.

20. A power management device for managing power to one or more associated sensing nodes of a sensor network from a powered node of a network other than the sensor network, the power management device comprising:

a detector for monitoring one or more of power conditions, and network conditions detected by the sensor network; and a power converter to convert power from a powered node of the other network to power appropriate for use by the power management device and to the one or more associated sensing nodes dependent on said conditions, including applying a first power management policy to a first sensing node and applying a second power management policy to a second sensing node, the first and second power management policies each specifying at least one of: power delivered to the sensing node and power demand of the sensing node.

21. A method for managing the power to a sensor network from a powered node of a network other than the sensor network, to one or more associated sensing nodes in a sensor network, the method comprising the steps of:

monitoring network conditions detected by the sensor network; and regulating power to the sensing node or to nodes of the other network depending on the conditions, including applying a first power management policy to a first sensing node and applying a second power management policy to a second sensing node, the first and second power management policies each specifying at least one of: power delivered to the sensing node and power demand of the sensing node.

22. A method for managing the power to a sensor network from a powered node of the network other than the sensor network, to one or more associated sensing nodes in a sensor network, the method comprising the steps of:

monitoring power conditions detected by the sensor network; and regulating power to the sensing node or to nodes of the other network depending on the conditions, including applying different power management policies to different nodes, the power management policies each specifying at least one of: power delivered to the sensing node and power demand of the sensing node.

23. A method for managing the power to a sensor network from a powered node of the network other than the sensor network, to one or more associated sensing nodes in a sensor network, the method comprising the steps of:

monitoring power conditions and network conditions detected by the sensor network; and regulating power to at least one of the sensing nodes and nodes of the other network, depending on the conditions, including applying a first power management policy to a first sensing node and applying a second power management policy to a first node of the other network, the first and second power management policies each specifying at least one of: power delivered to the sensing node and power demand of the sensing node.

24. The method for managing power to a sensor network according to claim 23 wherein, monitoring power conditions and network conditions detected by the sensor network; includes:

monitoring power level from an external source to at least one of the sensing nodes;

detecting a change in power level status with at least one of the sensing nodes; and regulating power to the at least one of the sensing nodes depending on power level status.

25. The method according to claim 24 wherein the step of regulating power to the at least one of the sensing nodes comprises:

reducing a power duty cycle for the at least one of the sensing nodes for a predetermined period responsive to a change in power level status from regular power level status; and restoring a higher or full duty cycle for the at least one of the sensing nodes when regular power level status is restored.

26. The method according to claim 24 wherein the power level status may be a function of time and condition.

* * * * *